United States Patent [19]

Majure et al.

[11] Patent Number: 4,945,608

[45] Date of Patent: Aug. 7, 1990

[54] FISH SCALER

[75] Inventors: James Majure; William N. Frazier, both of Philadelphia, Miss.

[73] Assignee: Fish Scalers, Inc., Philadelphia, Miss.

[21] Appl. No.: 19,429

[22] Filed: Feb. 26, 1987

[51] Int. Cl.$^5$ .............................................. A22C 25/02
[52] U.S. Cl. ................................................... 17/64
[58] Field of Search .................. 17/64, 67, 11.1 R, 51, 17/18, 71

[56] References Cited

U.S. PATENT DOCUMENTS

| | | |
|---|---|---|
| 71,434 | 11/1867 | White . |
| 1,383,162 | 6/1921 | Sprague . |
| 1,615,134 | 1/1927 | Price ........................................ 17/64 |
| 1,982,084 | 11/1934 | Strand ...................................... 17/67 |
| 2,331,855 | 10/1943 | Vucassovich . |
| 2,355,405 | 8/1944 | Vucassovich . |
| 3,304,574 | 2/1967 | Ham et al. . |
| 3,766,605 | 10/1973 | Burns ....................................... 17/64 |
| 4,226,004 | 10/1980 | Zimmerman et al. ................... 17/67 |
| 4,324,020 | 4/1982 | Garwin et al. . |
| 4,485,526 | 12/1984 | Opanasenko ........................... 17/64 |

FOREIGN PATENT DOCUMENTS

| | | | |
|---|---|---|---|
| 275714 | 6/1914 | Fed. Rep. of Germany ......... 17/64 |
| 450571 | 10/1927 | Fed. Rep. of Germany ......... 17/64 |

Primary Examiner—Willis Little
Attorney, Agent, or Firm—Nixon & Vanderhye

[57] ABSTRACT

A device for scaling a quantity of fish is disclosed which includes a hollow, rotatable drum provided with a plurality of spike elements arranged in a predetermined pattern or array about the entire circumferential surface of the drum, and projecting radially inwardly, generally toward the center axis of the drum. The drum is mounted for rotation by a perforated shaft, coincident with the center axis of the drum, the shaft also serving to supply liquid to the interior of the drum for washing the fish and for removing scales from the drum. A drainage pan is located beneath the drum and includes support elements for the drum and for motor means which rotates the drum.

23 Claims, 2 Drawing Sheets

FISH SCALER

BACKGROUND AND SUMMARY OF THE INVENTION

This invention relates to an apparatus for removing the scales of a quantity of fish, and more particularly, the invention relates to a small, portable, automatic fish scaler that will scale and wash between 35 and 60 pounds of fish in a single load.

There have been numerous attempts in the prior art to provide relatively simple yet efficient fish scaling apparatus. For example, U.S. Pat. No. 71,434 discloses a rotatable, cage like cylinder enclosing within its interior a pair of longitudinally extending blade members. The device is designed for rapid rotation while partially immersed in water within a reservoir or tank, and, as it rotates, fish within the cylinder are thrown across the blades which are designed to scrape the scales from the fish.

In U.S. Pat. No. 1,383,162, fish are loaded into a perforated cylinder, the interior surface of which is provided with curved projections for turning fish therein from one side to the other as the cylinder is rotated. A perforated pipe extends through the interior of the cylinder and is adapted to sprinkle water on the fish during the scaling operation.

U.S. Pat. Nos. 2,331,855 and 2,355,405 disclose fish scaling devices comprising rotatable cylinders formed of screen-like mesh material. The mesh is formed with sharp edges designed to scrape the scales from the fish as the cylinder rotates. Perforated pipes are also provided within the cylinders for supplying water to assist in the scaling operation and for maintaining the screen-like mesh clean and free of scales.

In U.S. Pat. No. 3,304,574, a cylindrical mesh-like basket is disposed within an outer rotatable drum for rotation therewith. High velocity jets of water are directed onto the fish to provide the scaling action and to increase the tumbling of the fish. The removed scales are washed from the basket and through a drain provided in the outer drum.

U.S. Pat. No. 3,766,605 discloses a similar system, but wherein the mesh construction of the inner cylinder itself is relied upon to scale the fish while low pressure water washes away the removed scales.

In U.S. Pat. No. 4,485,526, fish scaling apparatus is disclosed which includes a hollow, elongate fish scaling drum mounted on a frame for rotation about a longitudinal axis. A spiral strip portion of the interior circumferential surface of the drum includes a plurality of denticulations which provide an abrasive surface. The interior surface of the drum is also provided with a plurality of fish separating and reorienting wedge members, each of which comprises a pair of paddle members which converge toward a lead edge. The configuration is such that, as the drum rotates, the fish are caused to not only tumble but also move axially from an upstream to a downstream end of the drum.

These prior art devices have not been completely successful in all respects and, accordingly, there remains a need for a simple and efficient portable fish scaling apparatus which can be used by the ordinary fisherman, or small groups of fishermen, to clean and scale substantial amounts of fish in a short period of time.

In accordance with this invention, fish scaling apparatus is disclosed which comprises a hollow, generally cylindrical elongated fish scaling drum mounted on a combination drain pan and frame device and rotated by a mechanism, such as an electric motor, mounted on the frame. The fish scaling drum is preferably constructed of stainless steel or copper and is preferably about 17 inches in diameter. The drum may range in axial length from 15 to about 30 inches depending on the amount of fish that it is anticipated would normally be scaled and cleaned in each load.

The drum is further provided with a plurality of scaling spikes which project into the interior of the drum, generally radially with respect to the axis of rotation of the drum. The spikes preferably comprise stainless steel sheet metal screws or the like, about ⅜ inch in length. The spikes are arranged about the entire inner circumferential surface of the drum in a pattern of axially extending rows wherein, in each row, the spikes are axially spaced by a predetermined amount. The axially extending rows of spikes are spaced circumferentially from adjacent rows also by a predetermined amount. In addition, the screws of any given row are axially offset from screws of adjacent rows to create a staggered pattern of spikes.

The drum is designed to be rotated by the drive mechanism at about 30 rpm although it will be appreciated that variations in the speed may be appropriate depending on the size of the drum, etc.

The drum is also provided with a plurality of axially and circumferentially spaced drain holes, sized to permit scales and water to be washed from the drum and into a drain pan located beneath the drum.

The drum rotates about a hollow, perforated shaft or tube which is coincident with the center axis of the drum and which extends between the axial ends of the drum. The shaft supplies water to the interior of the drum during the scaling operation. At one end, the perforated shaft is coupled to an output shaft of the drive mechanism, while at the other end of the drum, the perforated shaft is rotatably mounted in a bearing housing located exteriorly of the drum. A water hose is connected to the perforated shaft at the bearing end by a swivel connector which allows the perforated shaft to rotate with the drum while the water hose remains stationary.

The fish scaling apparatus disclosed herein is intended to scale and wash in one load from 35 to 60 pounds of fish, which may range in size, for example, between small pan fish and 6 to 8 pound bass. The pattern of sheet metal screws, the length of the screws, the diameter of the drum, the rpm of the drum, and the spray of water within the drum constitute a precise combination of components that achieves complete and efficient scaling and washing of the fish.

It should be noted that, prior to the scaling operation, it is desirable to remove the heads and most of the internal parts of the fish. The scaling and washing operation will subsequently remove all of the scales, as well as the remainder of the internal parts of the fish, and will wash the fish to a degree where the fish can be cooked or frozen without further processing.

Other objects and advantages of the fish scaling apparatus of this invention will become apparent upon inspection of the detailed description of the invention which follows.

DETAILED DESCRIPTION OF THE INVENTION

Figure 1:
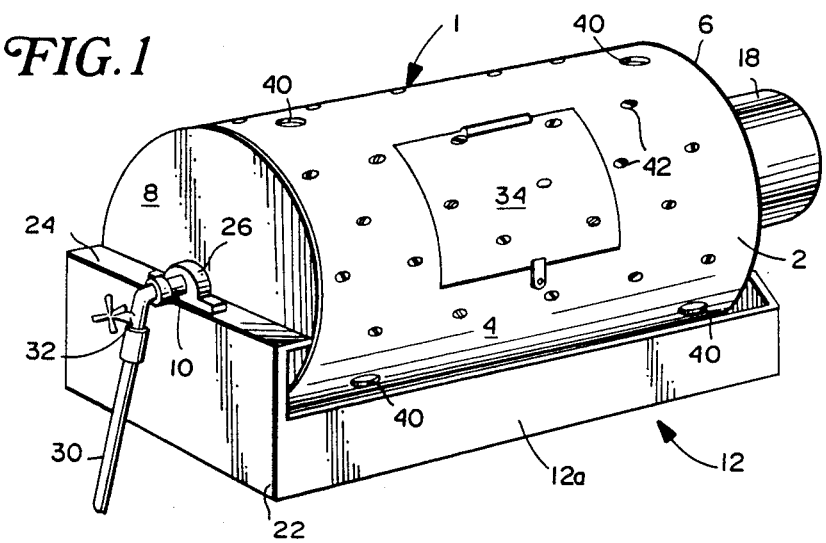
FIG. 1 is a perspective view of a fish scaling and washing apparatus in accordance with an exemplary embodiment of this invention.

Referring to FIGS. 1 through 4, a fish scaling and washing apparatus 1 is shown which includes a hollow, generally cylindrical drum 2 having an axially extending circumferential surface portion 4 and substantially closed end wall portions 6, 8. The drum is preferably constructed of stainless steel or copper, although other suitable materials may also be utilized. A hollow, perforated shaft or tube 10, also preferably of stainless steel or copper, extends between the end walls 6 and 8 of the drum and mounts the drum for rotation about a center axis A coincident with the shaft.

The drum is mounted on a support frame 12 which is configured as a drain pan constituted by sidewalls 12a, 12b, and end walls 14 and 22.

The first, or right side, end wall 14 extends upwardly above the sidewalls 12a, 12b and mounts an angularly extending support bracket 16 which supports a drive means, such as electric motor 18, the output shaft of which is axially connected to the perforated shaft or tube 10 by a suitable coupling element 20.

The second, or left side, end wall 22 of the frame 12 also extends above the sidewalls 12a, 12b and is provided at its upper edge with a flange 24 which provides a supporting surface for a bearing housing 26 in which the shaft 10 is rotatably journaled. A swivel connection 28 connects the shaft 10 to a water hose 30 adjacent the bearing housing 26. A spigot 32 is interposed between the connection 28 and hose 30 for supplying water to the drum from a source (not shown) as required.

The shaft 10 is provided with a plurality of axially and circumferentially spaced perforations 11 so that water from the hose 30 is dispensed in a radial pattern throughout the interior of the drum 2 as the shaft rotates with the drum.

Figure 2:
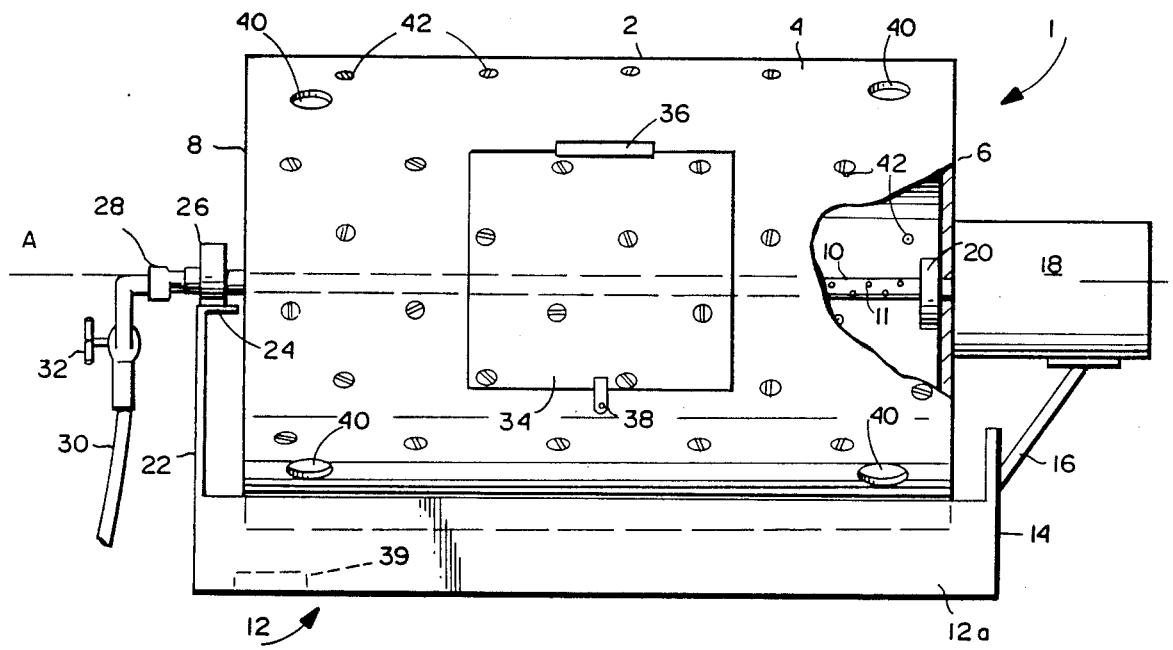
FIG. 2 is a side view of the apparatus as illustrated in FIG. 1.
Figure 3:
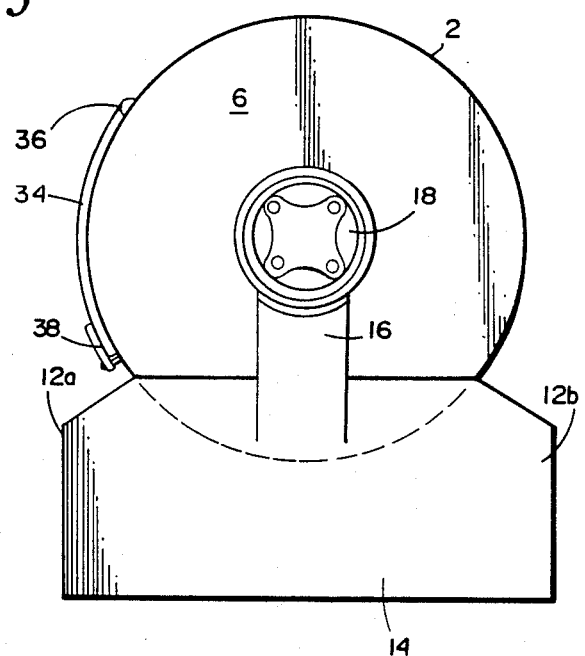
FIG. 3 is a left end view of the apparatus as illustrated in FIG. 2.
Figure 4:
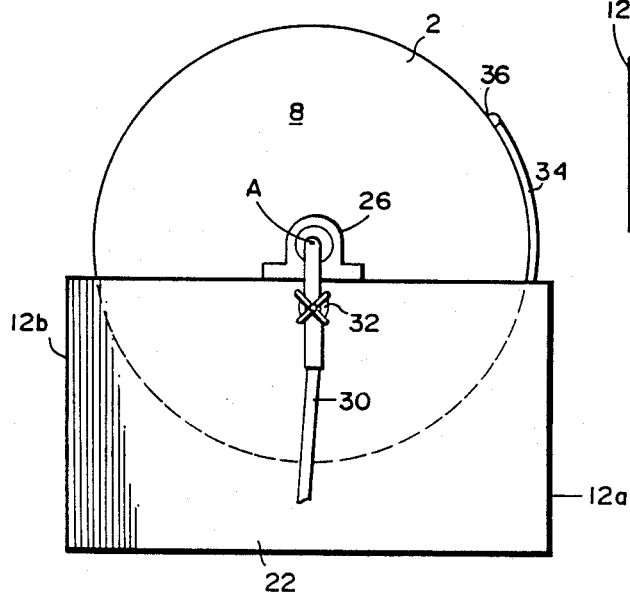
FIG. 4 is a is right end view of the apparatus disclosed in FIG. 2.

The circumferential surface 4 of the drum 2 is provided with an access door 34, hinged at 36, and provided with a suitable latch mechanism 38 for easy loading and unloading of a quantity of fish. The drum surface is also provided with a plurality of axially and circumferentially spaced drainage holes 40. For a 17 inch diameter drum having an axial length of from 15 to about 30 inches, about eight such drainage holes have been found to provide effective drainage of water and scales from the interior of the drum into the drain pan. It will be appreciated that a fewer or greater number of drainage holes may be employed, depending on drum size, volume of water supplied, amount of fish to be scaled, etc. It will also be appreciated that the pan itself may be formed with at least one drain hole, up to two inches in diameter. As best seen in FIG. 2, the drain hole 39 is for drainage of water and scales therefrom.

Figure 5:
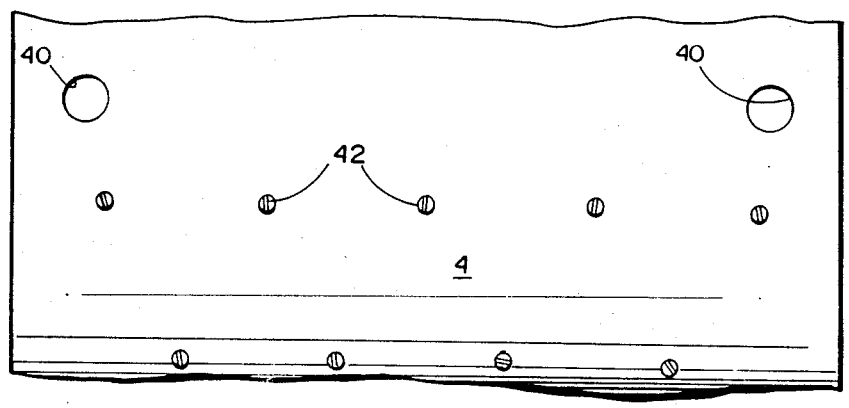
FIG. 5 is a detail of the circumferential surface of a rotatable scaling drum in accordance with an exemplary embodiment of the invention.

FIG. 5 illustrates a preferred pattern of drainage holes 40 and spike like scaling means 42 about the circumferential surface 4 of the drum 2. Spikes 42, which are radially inwardly directed toward the perforated shaft 10, are preferably arranged in axially extending rows such that there is a spacing of approximately 3 ¼ inches between spikes in any given row. In addition, each row is circumferentially spaced from adjacent rows also by approximately 3 ¼ inches. Spikes in each row are axially offset with respect to spikes in adjacent rows by approximately 1 ⅝ inches. This particular staggered pattern of spikes has been found to provide effective and complete scaling and cleaning of large quantities of fish for drums of the size described above.

The spikes 42 preferably comprise sheet metal screws, preferably approximately ⅝ of an inch in length, although other sizes may be used depending on the size of the drum and the kind and quantity of fish to be scaled. It will be appreciated that the sheet metal screws are easily threaded into the circumferential surface of the drum from the exterior side thereof so that the pointed shank portion of the screws extend radially inwardly towards the center axis A of the drum.

The drainage holes 40 are also arranged in a particular pattern about the circumference of the drum. For example, as shown in FIG. 5, drainage holes 40 preferably of ⅞ inch diameter, are spaced from each other by about 13 ½ inches both axially and circumferentially for a 17 inch diameter drum of at least 15 inches in length. For drums of greater length, additional drain holes may be provided.

It will be appreciated that the pattern of spikes, the size of the spikes, the drum size and speed of rotation, along with the supply of water, combine to provide complete scaling and thorough washing of the fish.

In operation, a suitably prepared quantity of fish, which may be in the range of 35 to 60 pounds for about a 17 inch diameter drum having an axial length of from about 15 to about 30 inches, is loaded into the drum 2 via access door 34. Suitable preparation of the fish in this case includes removing the heads and some of the internal parts of the fish in a conventional manner. Water is then supplied to the interior of the drum via spigot 32 through the hose 30 and through perforations 11 provided in the shaft 10. The electric motor 18, or other suitable drive means, is then actuated to rotate the drum, as well as shaft 10, preferably at a speed of about 30 rpm. The rotation of the drum, with its spiked interior surface, causes the fish to be continuously carried up one side of the drum and thereafter dropped to the bottom so that the fish are continuously abraded by the spikes or sheet metal screws 42 so as to completely remove all of the scales from the fish. At the same time, water dispensed from the perforated shaft 10 not only cleans the fish, but also carries away all removed scales and any remaining internal parts through the drainage holes 40 into the pan 12. The fish are then ready to be cooked or frozen for later use.

While the invention has been described in what is presently regarded as its most practical embodiment, it will be apparent to those of ordinary skill in the art that various changes and modifications may be made which nevertheless remain within the spirit and scope of the invention as defined by the claims that follow.

What is claimed is:

1. Fish-scaling apparatus comprising:
    a frame;

a hollow, cylindrical drum mounted on said frame for rotation about a center axis, said drum including a circumferential surface extending along said axis and first and second substantially closed ends;

means for rotating said drum about said axis;

means for dispensing liquid within said drum during rotation thereof;

elongated spike means projecting radially inwardly from said interior circumferential surface for scaling the fish, said spike means arranged in an array of alternating axially offset rows extending substantially parallel to said center axis about the entire circumferential surface of the drum; and drain means located at axially and circumferentially spaced locations about said drum surface.

2. Fish scaling apparatus as defined in claim 1, wherein said frame means includes a drain pan underneath said drum for receiving liquid and scales from said drain means.

3. Fish scaling apparatus as defined in claim 1, wherein said means for rotating said drum comprises motor means axially aligned with said axis and supported by said frame at the first end of said drum.

4. Fish scaling apparatus as defined in claim 1, wherein said means for dispensing liquid within said drum comprises perforated shaft means operatively connected at one end to said rotating means and extending along said axis to the second end of said drum, said shaft adapted to rotate with said drum.

5. Fish scaling apparatus as defined in claim 4, wherein said perforated shaft is supported adjacent a second end thereof in bearing means adjacent and exterior to said second end of said drum, the second end of said shaft being coupled to a liquid supply means.

6. Fish scaling apparatus as defined in claim 5 wherein said shaft is coupled to said liquid supply means by a swivel connection.

7. Fish scaling apparatus as defined in claim 5, wherein said bearing means is supported by said frame.

8. Fish scaling apparatus as defined in claim 1, wherein each of said rows are circumferentially spaced about 3.25 inches from each other, and wherein individual spike means in each row are spaced from each other by about 3.25 inches.

9. Fish scaling apparatus as defined in claim 8, wherein individual spike means in each of said rows is axially offset from individual spike means in adjacent rows by about 1.625 inches.

10. Fish scaling apparatus as defined in claim 1, wherein said spike means comprise sheet metal screws, each about 0.375 inches in length.

11. Fish scaling apparatus as defined in claim 1, wherein said drain means comprises a plurality of holes.

12. Fish scaling apparatus as defined in claim 1, wherein said drum is provided with access means on said circumferential surface for loading said drum with fish.

13. A device for scaling a plurality of fish simultaneously, said device comprising:

a cylindrical drum having a hollow interior scaling chamber and mounted for rotation about a center axis thereof; and scaling means projecting into the interior of said drum and comprising a plurality of radially inwardly directed elongated spikes, said spikes threadably received in said drum and arranged in a plurality of axially extending rows circumferentially spaced about the interior of the drum, wherein spikes in one row are axially offset with respect to spikes in adjacent rows.

14. A device as defined in claim 13 wherein each of said spikes is about 0.375 inches in length.

15. A device as defined in claim 13 wherein said spikes are sheet metal screws.

16. A device as defined in claim 13, wherein spikes in any one row are axially offset from spikes in adjacent rows by about 1.625 inches.

17. A device as defined in claim 13, wherein spikes in any given row are axially spaced from each other by 3.25 inches, and wherein adjacent rows of spikes are circumferentially spaced from each other by about 3.25 inches.

18. A device as defined in claim 13, and including means for rotating said drum.

19. A device as defined in claim 18, wherein said rotating means comprises electric motor means for rotating said drum at a speed of about 30 rpm.

20. A device as defined in claim 19, wherein said drum is about 17 inches in diameter and from about 15 to about 30 inches in length.

21. A device as defined in claim 13 and further including means for dispensing liquid within said drum interior for washing the fish, and means for draining said liquid along with scales removed from said fish from said drum.

22. A device as defined in claim 21 and further including a drain pan provided exteriorly and below said drum for receiving said liquid and said fish scales, said drain pan supporting said drum for rotation about an axis coincident with said dispensing means.

23. A device as defined in claim 13 wherein said drum is provided with access means comprising a door hinged to the circumferential surface of said drum for loading a plurality of fish into the drum.

* * * * *